United States Patent
Wernimont et al.

(10) Patent No.: US 12,121,007 B2
(45) Date of Patent: Oct. 22, 2024

(54) METHOD FOR DETERMINING BIOMETRIC DATA RELATING TO AN ANIMAL BASED ON IMAGE DATA

(71) Applicant: Hill's Pet Nutrition, Inc., Topeka, KS (US)

(72) Inventors: Susan Wernimont, Lawrence, KS (US); Robin Thompson, Northumberland (GB); Stephen G. Matthews, Oxford (GB)

(73) Assignee: Hill's Pet Nutrition, Inc., Overland Park, KS (US)

( * ) Notice: Subject to any disclaimer, the term of this patent is extended or adjusted under 35 U.S.C. 154(b) by 37 days.

(21) Appl. No.: 17/939,276

(22) Filed: Sep. 7, 2022

(65) Prior Publication Data

US 2023/0073738 A1    Mar. 9, 2023

Related U.S. Application Data (60) Provisional application No. 63/241,173, filed on Sep. 7, 2021.

(51) Int. Cl.
*G06N 3/08* (2023.01)
*A01K 29/00* (2006.01)
(Continued)

(52) U.S. Cl.
CPC .......... *A01K 29/005* (2013.01); *G06V 10/25* (2022.01); *G06V 10/26* (2022.01); *G06V 10/70* (2022.01); *G06V 20/64* (2022.01); *G06V 40/10* (2022.01)

(58) Field of Classification Search
CPC .......... Y02A 50/30; H04N 5/33; H04N 23/90; G16H 30/40; G16H 50/50; G06V 10/25;
(Continued)

(56) References Cited

U.S. PATENT DOCUMENTS 6,850,798 B2   2/2005  Morgan et al.
7,853,046 B2  12/2010  Sharony
(Continued)

FOREIGN PATENT DOCUMENTS

CA    2744146     6/2010
CN  107635509     1/2018
(Continued)

OTHER PUBLICATIONS

Kocabey et al., 2017, "Face to BMI Using Computer Vision to Infer Body Mass Index on Social Media, proceedings of the Eleventh International AAAI Conference on Web and Social Media (ICWSM 2017): 572-575".
(Continued)

*Primary Examiner* — Dionne Pendleton (57) ABSTRACT

A method, device, and system for determining a body attribute of an animal may be provided. For example, a system may include a sensor configured to capture image data relating to the animal. One or more processors may be configured to receive the captured image data relating to the animal; identify portions relating to the animal depicted within the image data; input, into a machine learning model, the portions relating to the animal depicted within the image data; and determine, via the machine learning model, an ideal body weight (IBW), a body condition score (BCS) of the animal, a body fat index (BFI) of the animal, a weight or other attributes of the animal or part of the animal including height, width, length, depth, diameter, radius, circumference, and the like.

18 Claims, 6 Drawing Sheets

(51) Int. Cl.
*G06T 17/00* (2006.01)
*G06V 10/25* (2022.01)
*G06V 10/26* (2022.01)
*G06V 10/70* (2022.01)
*G06V 20/64* (2022.01)
*G06V 40/10* (2022.01)

(58) Field of Classification Search
CPC ...... G06V 10/255; G06V 10/26; G06V 10/46; G06V 10/70; G06V 20/00; G06V 20/10; G06V 20/56; G06V 20/59; G06V 20/64; G06V 40/10; G06Q 10/0832; G06N 20/20; G06N 3/08; G01G 17/08; G01G 23/00; G01G 23/35; G01G 9/00; G01B 11/02; B60R 5/00; B60R 7/00; B25J 11/008; B25J 19/0075; B25J 9/0018; B25J 9/1679; B25J 9/1697; A61K 31/20; A61K 31/702; A23V 2002/00; A23V 2250/1886; A23V 2250/206; A23V 2250/502; A23V 2250/54246; A23V 2250/54252; A23V 2250/55; A23V 2250/612; A23L 33/12; A23L 33/40; G06T 17/20; G06T 2207/10048; G06T 2207/20084; G06T 7/11; G06T 17/00; G06T 19/00; G06T 2200/08; G06T 2207/10028; G06T 2207/20081; G06T 2207/30048; G06T 2207/30104; G06T 2210/41; G06T 7/0012; G06T 7/60; G06T 7/62; G06T 7/70; G06T 7/97; G06T 2207/30196; G06T 7/55; G06T 7/74; G06T 7/80; A01K 29/005

See application file for complete search history.

(56) References Cited

U.S. PATENT DOCUMENTS

| | | | |
|---|---|---|---|
| 10,249,054 | B2 | 4/2019 | Amat Roldan et al. |
| 11,069,131 | B2 | 7/2021 | Agrawal et al. |
| 2013/0121461 | A1 | 5/2013 | Toll et al. |
| 2014/0029808 | A1 | 1/2014 | Lee |
| 2018/0049695 | A1 | 2/2018 | Hector, Jr. |
| 2021/0045361 | A1* | 2/2021 | Dumm .................. G01G 23/00 |
| 2022/0122431 | A1* | 4/2022 | Barton .................... G06T 7/80 |
| 2023/0337636 | A1* | 10/2023 | Shmigelsky ........... G06V 40/10 |

FOREIGN PATENT DOCUMENTS

| | | |
|---|---|---|
| CN | 110163846 | 8/2019 |
| EP | 2027770 | 2/2009 |
| EP | 3127088 | 2/2017 |
| JP | 2007-175200 | 7/2007 |
| JP | 2019-187277 | 10/2019 |
| KR | 102264281 | 6/2021 |
| WO | 2016/192853 | 12/2016 |
| WO | 2017/030448 | 2/2017 |

OTHER PUBLICATIONS

Poppy Gant et al., 2016, "Can you estimate body composition in dogs from photographs?", BMC Veterinary Research.
Wen, 2013, "Image and Vision Computing", Elsevier:392-400.
Anonymous, 2013, "Calculating your dog's ideal weight—Calculating your cat's ideal weight", Pet BCS, pp. 1-2.
Chang et al., 2012, "A systematic review of body fat distribution and mortality in older people", Maturitas Elsevier, 72 (3):175-191.
Delisa Appleton, 2021, "Ideal body weight—why guessing is not good enough", Hill's Veterinary Nutrition Blog, pp. 3.
Dey Ayon, 2016, "Machine learning algorithms: A review", International Journal of Computer Science and Information technologies, 7(3).
International Search Report and the Written Opinion of the International Searching Authority issued in International Application PCT/US2022/042688 mailed Jan. 4, 2023.
Yongliang et al., 2021, "Intelligent perception for cattle monitoring: A review for cattle identification, body condition score evaluation, and weight estimation", Computers and Electronics in Agriculture, vol. 185.

* cited by examiner

METHOD FOR DETERMINING BIOMETRIC DATA RELATING TO AN ANIMAL BASED ON IMAGE DATA

CROSS-REFERENCE TO RELATED APPLICATION

This application claims of the benefit of priority from U.S. Provisional Application No. 63/241,173, filed Sep. 7, 2022; the contents of which are hereby incorporated herein by reference in their entirety.

BACKGROUND

Overweight or obese pets are an increasingly common and significant health issue. Such conditions predispose the pets to joint diseases such as arthritis, metabolic diseases such as diabetes, limits the pet's ability to engage in activities of daily living such as getting into or out of cars, onto beds or furniture, and limits the activities they can perform such as running, jumping, playing, walking, etc. Pet parents are often unable or unwilling to accurately assess the presence and degree of overweight or obesity in their pet. Pet weight is often difficult to measure in a home environment since human scales do not have enough surface area to accommodate a pet and large animals are simply too big to stand on (or be held by a pet owner standing on) a human scale. As a result, pet weight is often measured infrequently, usually only when the pet visits the veterinarian's office (i.e., once a year or less).

For the above reasons, many pet parents often do not know their pet's weight, ideal body weight (IBW), body condition score (BCS), or body fat index (BFI) and therefore cannot feed their pet appropriately While veterinarians and other members of the veterinary healthcare team have the required training to accurately assess weight, IBW, BCS and BFI, they are often reluctant to raise issues related to pet overweight and obesity with pet parents as it is an uncomfortable topic to address and subjective, even when formally assessed by a trained veterinarian. Accordingly, it would be desirable to have a scoring tool for weight, IBW, BCS or BFI that automatically scores these parameters in a way that is objective and does not require special pet scales or a trip to the veterinarian's office. A possible solution to this issue is to score weight, IBW, BCS or BFI based on a photo or video of the animal. Such scoring would allow an objective assessment of pet weight, IBW, BCS or BFI that could be administered repeatedly, inexpensively, and easily by the pet parent at home. Such a tool would allow the pet parent and the veterinarian to use the tool outside of the veterinarian's office, such as in the home of the pet, and in conjunction with tools such as telehealth. As a result, the health and well-being of the pet could be more accurately and frequently evaluated, which can result in the veterinarian making more accurate and timely health and nutritional recommendations for the pet, such as recommendations for weight loss or weight management foods and adjustments to feeding amounts or frequencies, etc., as appropriate.

BRIEF SUMMARY

The present disclosure may be directed, in one aspect, to a method, device, and system for determining a body attribute of an animal. For example, a system may include one or more sensors configured to capture image or video data relating to the animal. One or more processors may be configured to receive the captured image or video data relating to the animal; identify at least two portions relating to the animal depicted within the image data; input, into a machine learning model, at least two portions relating to the animal depicted within the image data; and determine, via one or more machine learning models, the weight, IBW, BCS and BFI of the animal.

BRIEF DESCRIPTION OF THE DRAWINGS

The present disclosure will become more fully understood from the detailed description and the accompanying drawings, wherein.

DETAILED DESCRIPTION

The following description of the preferred embodiment(s) is merely exemplary in nature and is in no way intended to limit the invention or inventions. The description of illustrative embodiments is intended to be read in connection with the accompanying drawings, which are to be considered part of the entire written description. In the description of the exemplary embodiments disclosed herein, any reference to direction or orientation is merely intended for convenience of description and is not intended in any way to limit the scope of the present inventions. Relative terms such as "lower," "upper," "horizontal," "vertical," "above," "below," "up," "down," "left," "right," "top," "bottom," "front" and "rear" as well as derivatives thereof (e.g., "horizontally," "downwardly," "upwardly," etc.) should be construed to refer to the orientation as then described or as shown in the drawing under discussion. These relative terms are for convenience of description only and do not require a particular orientation unless explicitly indicated as such. Terms such as "attached," "affixed," "connected," "coupled," "interconnected," "secured" and other similar terms refer to a relationship wherein structures are secured or attached to one another either directly or indirectly through intervening structures, as well as both movable or rigid attachments or relationships, unless expressly described otherwise.

The discussion herein describes and illustrates some possible non-limiting combinations of features that may exist alone or in other combinations of features. Furthermore, as used herein, the term "or" is to be interpreted as a logical operator that results in true whenever one or more of its operands are true. Furthermore, as used herein, the phrase "based on" is to be interpreted as meaning "based at least in part on," and therefore is not limited to an interpretation of "based entirely on."

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

Features of the present inventions may be implemented in software, hardware, firmware, or combinations thereof. The computer programs described herein are not limited to any particular embodiment, and may be implemented in an operating system, application program, foreground or background processes, driver, or any combination thereof. The computer programs may be executed on a single computer or server processor or multiple computer or server processors.

Processors described herein may be any central processing unit (CPU), microprocessor, micro-controller, graphics processing unit (GPU), computational, or programmable device or circuit configured for executing computer program instructions (e.g., code). Various processors may be embodied in computer and/or server hardware of any suitable type (e.g., desktop, laptop, notebook, tablets, smart phones, edge computing devices, embedded devices, etc.) and may include all the usual ancillary components necessary to form a functional data processing device including without limitation software and data storage such as volatile and non-volatile memory, input/output devices, graphical user interfaces (GUIs), removable data storage, and wired and/or wireless communication interface devices including Wi-Fi, Bluetooth (e.g., Bluetooth classic, Bluetooth low energy), LAN, etc.

Computer-executable instructions or programs (e.g., software or code) and data described herein may be programmed into and tangibly embodied in a non-transitory computer-readable medium that is accessible to and retrievable by a respective processor as described herein which configures and directs the processor to perform the desired functions and processes by executing the instructions encoded in the medium. A device embodying a programmable processor configured to such non-transitory computer-executable instructions or programs may be referred to as a "programmable device", or "device", and multiple programmable devices in mutual communication may be referred to as a "programmable system." It should be noted that non-transitory "computer-readable medium" as described herein may include, without limitation, any suitable volatile or non-volatile memory including random access memory (RAM) and various types thereof, read-only memory (ROM) and various types thereof, USB flash memory, and magnetic or optical data storage devices (e.g., internal/external hard disks, floppy discs, magnetic tape CD-ROM, DVD-ROM, optical disk, ZIP™ drive, Blu-ray disk, and others), which may be written to and/or read by a processor operably connected to the medium.

In certain embodiments, examples may be embodied in the form of computer-implemented processes and apparatuses such as processor-based data processing and communication systems or computer systems for implementing those processes. The present inventions may also be embodied in the form of software or computer program code embodied in a non-transitory computer-readable storage medium, which when loaded into and executed by the data processing and communications systems or computer systems, the computer program code segments configure the processor to create specific logic circuits configured for implementing the processes.

Many animals (e.g., pets, such as dogs and cats) are overweight and/or obese. Similar to humans, pet overweight and obesity has serious health implications. Overweight pets are at greater risk for comorbidities such as heart disease, diabetes, joint ailments (arthritis), high blood pressure, respiratory issues, cancer and surgical/anesthetic complications. Moreover, overweight pets may have shorter life spans than fit pets. In human medicine, metrics such as Ideal Body Weight (IBW) or Body Mass Index (BMI) are used to interpret the current weight of a person and determine the presence and degree of overweight and/or obesity (for example, presenting current weight as a percent of IBW, or using current weight to calculate the person's BMI. Both percent IBW and BMI can be compared to thresholds for interpretation.) In an analogous way, metrics such as Ideal Body Weight (IBW), Body Condition Score (BCS), and Body Fat Index (BFI) are used to interpret the current weight of a pet and determine the presence and degree of overweight and obesity (for example, presenting current weight as a percent of IBW, or comparing the pet's body shape to a BCS visual scale).

The BFI is a method for quantifying the percent of a cat or dog's body weight that is body fat and the health risk associated with that degree of body fat. However, tools such as weight, IBW, BCS and BFI may be difficult to accurately assess for a variety of reasons, including barriers to obtaining the needed physical measurements or assessments (e.g. measuring the animal's anatomy, weighing the animal, palpating the animal to evaluate bone, fat, muscle, etc.). Weight, IBW, BCS and BFI may also be difficult to accurately assess or interpret due to characteristics of the pet, including the wide range of different body types, different sizes or shapes of body parts, different hair types, etc. exhibited across cats and dogs of different ages, genetic backgrounds, etc.

Despite the variety of body types, shapes, etc. in pets, a system may be used for evaluating BCS of pets. Two BCS scales may be utilized, one ranging from 1-5 and the other ranging from 1-9. Some veterinarians may prefer the 1-9 scale which has more latitude to characterize subtle changes in body condition score. Other veterinarians may prefer the 1-5 scale which is simpler to score and interpret due to fewer categories. Furthermore, the interpretation of a given score will vary depending on the BCS scale that is being used. For the 1-5 scale, $1/5$ may be under ideal body composition or underweight; $2/5$ may be below ideal body composition or below ideal weight; $3/5$ may be ideal body composition or ideal body weight; $4/5$ may be above ideal body composition or above ideal weight; and 5/5 may be over ideal body composition or overweight. For the 1-9 scale, $1/9$, $2/9$, and $3/9$ may be under ideal body composition or under ideal weight, $4/5$ and 5/5 may be ideal body composition or ideal body weight and $6/9$, $7/9$, $8/9$ and 9/9 may be over ideal body composition or over ideal weight. For example, a dog with a BCS of 5 would be classified as over ideal body composition or overweight on the 5 point scale (5/5) and would be classified as ideal body composition or ideal body weight on the 9 point scale ($5/9$). A cat with a BCS of 3 would be classified as ideal body composition or ideal weight on the 5 point scale ($3/5$) and under ideal body composition or under ideal weight on the 9 point scale ($3/9$).

Accurately assigning a score may require training and may be most accurate if performed by a veterinarian who visually examines, weighs, measures and palpates the pet. Because of the knowledge required to accurately perform a weight, IBW, BCS or BFI assessment, the fact that not all pets receive regular veterinary care, and the general increase in overweight and obesity among cats and dogs, many pet parents do not identify their pet as being overweight or obese. Furthermore, even if a pet parent notices their pet being somewhat overweight, the pet parent may not be aware of the degree to which the pet is overweight or obese or how much such weight can affect the health of the pet. And, in addition to affecting the health of the pet, excess weight can negatively impact the pet's general well-being and overall quality of life.

Although weight gain may be the result of an increase in body fat that is typically caused by excess nutrient intake and/or a lack of exercise, there can be other contributing factors causing weight gain. Such factors may include the age of the pet, the breed of the pet, the metabolism of the pet, medical disorders of the pet, and the like. For example, older pets may be less active and may require fewer calories based on activity levels compared to their more active younger years. Some cat and dog breeds are more predisposed to gaining weight. Changes in health history or lifestage may result in alterations in metabolism, which may result in such pets requiring fewer calories. And medical disorders may require specific treatment, which may occasionally be associated with weight gain. Further, the type and quantity of food offered to and consumed by the pet may affect the overall health and well-being of the pet. Proper nutrition plays an important role in treating an overweight pet. Although a veterinarian may be able to recommend weight management foods to help a pet lose weight and maintain a healthy and active lifestyle, the pet must first be identified as being currently overweight or obese, or as having a predisposition to developing overweight and/or obesity.

Although indicators such as the weight, IBW, BCS, and BFI of the pet may provide an indication of whether a pet is overweight or obese, such indicators may not be identified for a variety of reasons. For example, the weight, IBW, BCS, and BFI of the pet may not be determined because a pet parent may not bring the pet to the veterinarian for a checkup. In other examples, the pet's weight status may not be included as part of the veterinary evaluation received by the pet, or if weight status is included as part of the veterinary evaluation, the degree of overweight or obesity may not be accurately characterized. In other examples, the pet's weight status may be evaluated and accurately characterized but may not be included in the discussion with the pet parent.

To avoid the shortcomings of the conventional weight management system of pets, as described herein, a system, method, and/or device is provided that allows weight factors of the pet to be automatically and/or objectively determined. Such system, method, and/or device may require little or no training in its use and be performed by the pet parent (e.g., in the home of the pet parent) by the veterinarian, and/or other member of the veterinary health care team. Such system, method, and/or device may reside and/or communicate with a mobile device of a user, an external server (e.g., a cloud server), and the like, in examples.

Figure 1:
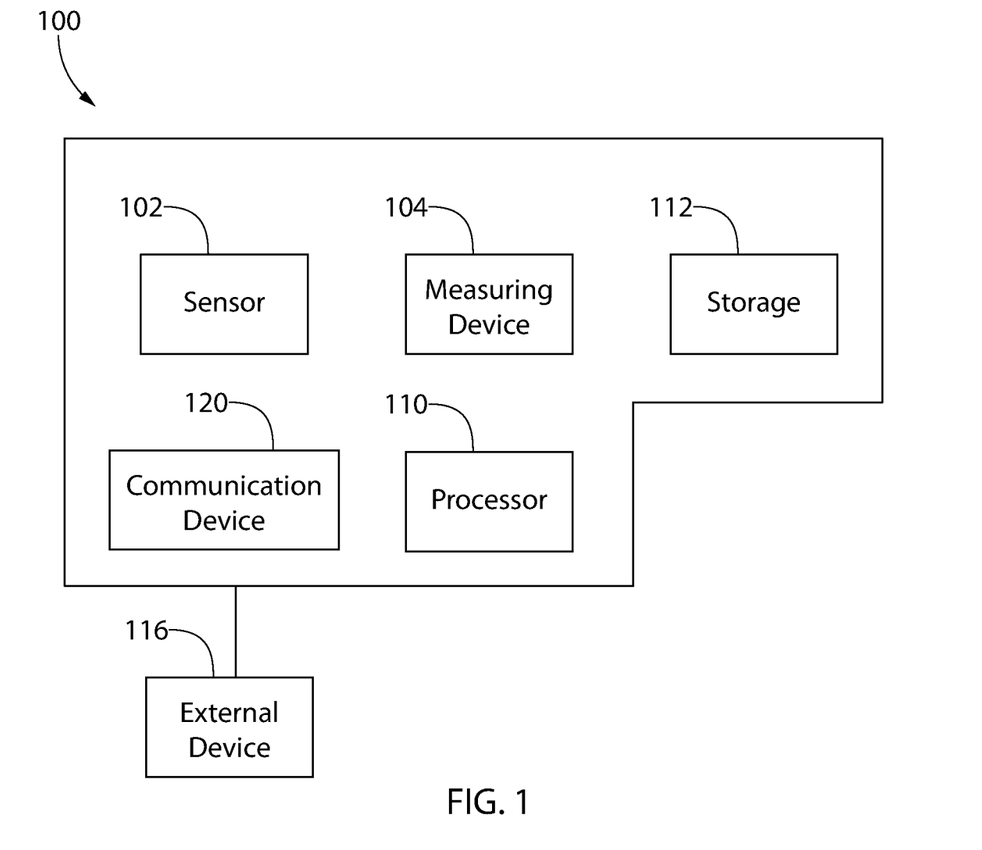
FIG. 1 is a block diagram of a system having a plurality of modules configured to collect and analyze data for determining a body attribute of an animal, as described herein.

FIG. 1 shows an example system 100 for determining a body attribute of an animal, such as the weight, IBW, BCS, or BFI. Example animals may include a pet (e.g., cat, dog, bunny, guinea pig, bird), a farm animal (e.g., a horse, cow, chicken), a zoo animal (e.g., a lion, bear), an animal in the wild, and the like. System 100 may include one or more electronic devices 101. Electronic device 101 may include one or more sensors 102, processors 110, measuring devices 104, communication devices 120, and/or storage devices 112. Electronic device 101 may be an implantable device, as described herein. One or more devices of system may communicate with one or more of the devices within electronic device 101 and/or one or more devices external to electronic device 101, such as external devices 116.

Sensor 102 may be configured to detect and/or convey information of the animal and/or the surroundings of the animal. For example, sensor 102 may be configured to detect and/or convey image information (e.g., still image information or moving image information) of the animal and/or the surroundings of the animal; audio information of the animal and/or the surroundings of the animal; temperatures of the animal and/or the surroundings of the animal, etc. Sensor 102 may be one or more of a variety of form factors, including photographic cameras (e.g., depth sensing cameras, thermal cameras), video cameras, camcorders, audio sensors, and a combination thereof. In examples, sensor 102 may include one or more of thermometers, microphones, and the like.

Sensor 102 may be one or more of optical sensors, optical reflecting sensors, LED/photodiode pair optical sensors, LED/phototransistor pair optical sensors, laser diode/photodiode pair optical sensors, laser diode/phototransistor pair optical sensors, optocouplers, optical fiber coupled optical sensors, magnetic sensors, ultrasonic sensors, weight sensors, force sensors, displacement sensors, pressure sensors, various proximity sensors, such as inductive proximity sensors, magnetic proximity sensors, capacitive proximity sensors, and/or a combination thereof. Sensor 102 may include communication circuitry, such as Bluetooth (e.g., classic Bluetooth and/or Low Energy Bluetooth), RFID, Wi-Fi, and other wireless technologies.

System 100 may include one or more measurement devices 104. Measuring device 104 may be configured to measure a characteristic related to the animal. Measurement device 104 may be a device that is the same as sensor 102, or measurement device 104 may be a device that is different than sensor 102. For example, sensor 102 may be a sensor for measuring the visual appearance of a pet (e.g., camera) or structure (e.g., 3D camera). Measurement device 104 may be a sensor for measuring physical properties directly, such as weight, force etc. Example measuring devices 104 may be implemented in one or more of a variety of form factors, including, but not limited to, weighing scales, weight transducers, force transducers, displacement transducers, pressure transducers, weight sensors, force sensors, displacement sensors, pressure sensors, real time clocks, timers, counters, and/or a combination thereof. Measuring device 104 may include communication circuitry, such as Bluetooth (e.g., classic Bluetooth and/or Low Energy Bluetooth), RFID, Wi-Fi, Medical Implant Communication System (MICS) (e.g., a hybrid of the technologies, such as MICS/Bluetooth), and other wireless technologies, and other wireless technologies.

System 100 may include one or more storage devices 112. Storage device 112 may be configured to store data provided to and/or from system 100. The data may include data provided by sensor 102 (e.g., image data, audio data), data provided by measurement device 104 (e.g., weight data), location data, and the like. Data may include algorithm data, such as the machine learning algorithms used to determine BCS and BFI of the animal. Example storage devices 112 may be memory devices, data storage devices, and a combination thereof, such as memory chips, semiconductor memories, Integrated Circuits (IC's), non-volatile memories or storage device such as flash memories, Read Only Memories (ROM's), Erasable Read Only Memories (EROM's), Electrically Erasable Read Only Memories (EEROM's), Erasable Programmable Read Only Memories (EPROM's), Electrically Erasable Programmable Read Only Memories (EEPROM's), an Electrically Erasable Programmable Read Only Memory (EEPRO), volatile memories such as Random Access Memories (RAM's), Static Random Access Memories (SRAM's), Dynamic Random Access Memories (DRAM's), Single Data Rate memories (SDR's), Dual Data Rata memories (DDR's), Quad Data Rate memories (QDR's), microprocessor registers, microcontroller registers, CPU registers, controller registers, magnetic storage devices such as magnetic disks, magnetic hard disks, magnetic tapes, optical memory devices such as optical disks, compact disks (CD's), Digital Versatile Disks (DVD's), Blu-ray Disks, Magneto Optical Disks (MO Disks) and/or a combination thereof. Storage 112 may be an external memory device, such as a USB flash memory, an external hard drive, etc.

System 100 may include one or more processors 110 configured to calculate and/or process data provided to system 100, for example. Example processors may be electronic circuits, systems, modules, subsystems, sub modules, devices, and combinations thereof, such as Central Processing Units (CPUs), graphics processing units (GPUs), microprocessors, microcontrollers, processing units, control units, tangible media for recording and/or a combination thereof. Storage device 112 may be configured to store derived data from the processor 110. Processor 110 may include communication circuitry, such as Bluetooth (e.g., classic Bluetooth and/or Low Energy Bluetooth), RFID, Wi-Fi, and other wireless technologies.

System 100 may include an external device 116, such as a mobile phone, laptop (collectively referred to as mobile device), and/or server. Mobile device may include one more other devices, such as a tablet, watch, etc. Electronic device 101 may be wirelessly connected to one or more other devices, such as external device 116. For example, electronic device 101 may communicate with external device 116 via communication device 120.

Sensor 102, measurement device 104, processor 110, and/or storage device 112 may be assembled in a number of configurations, including as a single device, in a stand-alone apparatus or a combination thereto. In other examples, the processor 110 and/or storage 112 may be configured as remote devices, such as remote servers (e.g., cloud storage devices). Although FIG. 1 shows a connection between processor 110 and each of sensor 102, measuring device 104, and storage 112, examples should not be so limited. In examples one or more of the devices may communicate with one or more (including any, or none) of the other devices. For example, sensor device 102 may communicate with processor 110 and storage device 112, sensor device 102 may not communicate with storage device 112, etc. One or more devices may be added and/or removed from system 100. For example, additional sensor devices 102 may be added to system 100 and/or storage device 112 may be removed from system 100.

Data (e.g., image data, audio data, temperature data, weight data) relating to the animal may be processed and/or recorded for a determination of the IBW, BCS, BFI, and/or weight of the animal. Data relating to the animal may be recorded (e.g., via a video recording, picture, and/or audio recording) and/or may be processed via processor 110. The one or more processors 110 may perform computations of the data, for example, to determine the IBW, BCS, BFI, and/or weight of the animal. The one or more processors may be housed on one or more external devices 116. The sensor 102, measurement device 104, and/or external devices 116 may be configured to communicate data to the user and/or one or more other parties (e.g., a veterinarian, family member, etc.).

As described herein, machine learning may be used to determine the IBW, BCS, BFI, and/or weight of the animal. For example, sensor 102 (e.g., camera, camcorder) may capture images within one or more locations in which the pet is present, was present, or will be present. The images may be presented to a machine learning model. The machine learning model may be a standard machine learning model and/or a subset of machine learning (such as a deep learning model), although it should be understood that one or more other machine learning models may be used.

As known by those of skill in the art, machine learning may work with hand crafted features and relatively simple trainable classifiers. With typical machine learning, feature engineering/extraction may be time consuming for training of the model and inference. Deep learning is a part of machine learning based on artificial neural networks with representative learning. Deep learning has an inbuilt automatic multi stage feature learning process that learns rich hierarchical representations (e.g., features). With typical deep learning models, model training may be time consuming and require high computation power. Prediction can be very fast and does not necessarily require high computation power. Prediction can be performed on edge computing devices, smart phones, embedded devices, etc.

Figure 2:
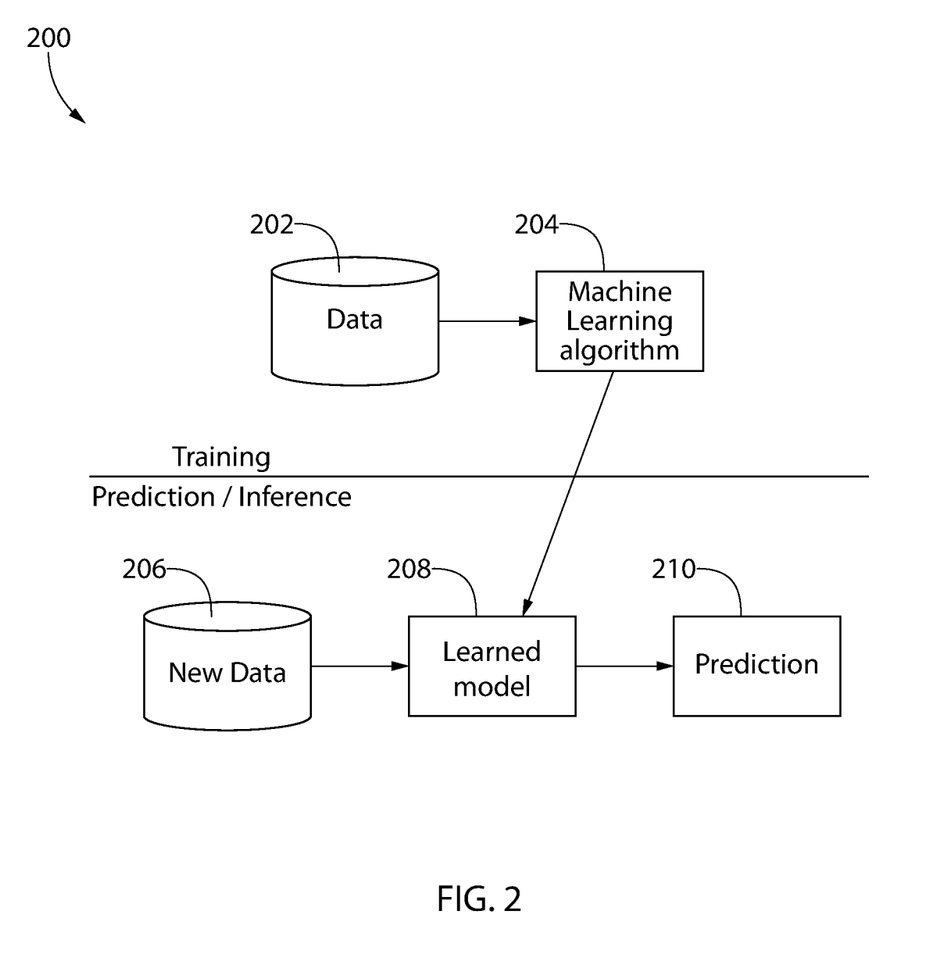
FIG. 2 shows a block diagram of using a machine learning model to determine a body attribute of an animal, as described herein.

FIG. 2 shows an example process 200 for using machine learning (e.g. deep learning) to determine the IBW, BCS, BFI, and/or weight of the animal. For example, a single model (e.g., machine learning model) can determine one or more of IBW, BCS, BFI, and/or weight of the animal. As shown on FIG. 2, the machine learning model is trained using captured images of objects within a location. The objects include an animal and may include clothing or other items (e.g., collars) worn by the animal, furniture, doors, windows, and the like. An object of a known dimension may be captured within the location so that a baseline of dimensions may be determined. For example, the animal may wear a collar of a known dimension, an object of known dimension may be provided alongside the animal as a reference point, and the like. The size and dimensions of portions of the animal (or the entire animal) may be determined based on a comparison of the animal and the object of the known dimension.

As described herein, the trained model may be used to predict and/or determine the IBW, BCS, BFI, and/or weight of the animal from an image not used during model training. Further, although IBW, BCS, BFI, and/or weight are described herein, it should be understood that such examples are for illustration purposes only. Other attributes of the animal may be determined, such as height, width, length, depth, diameter, radius, circumference of the entire animal or parts of the animal and the like may be determined in examples.

Data may be identified and/or received. As shown on FIG. 3, the data may include images 300 that depict one or more animals, objects, locations, and the like. For example, images may be provided that show a dog 302 within a room. The room may include one or more objects, such as a door 304, window 308, bedding 310. The dog 302 may be wearing an item, such as collar 303. An object 306 of a predetermined dimension and structure may be presented in the image. Although the image 300 may present object 306 having the form factor of a plant holder that is a known dimension, object 306 may be one or more other objects having one or more other form factors with predetermined dimensions and structure, such as a collar worn by the animal, a painting to be hung on the wall, a food dish, a water dish, a feeder, a pet bed, a toy, and the like. As the system 100 knows the dimensions of object 306, system 100 may determine sizes of one or more portions of dog 302, such as the size of eyes, head, torso, ears, feet, etc., of dog 302, based on the size of object 306.

Figure 3:
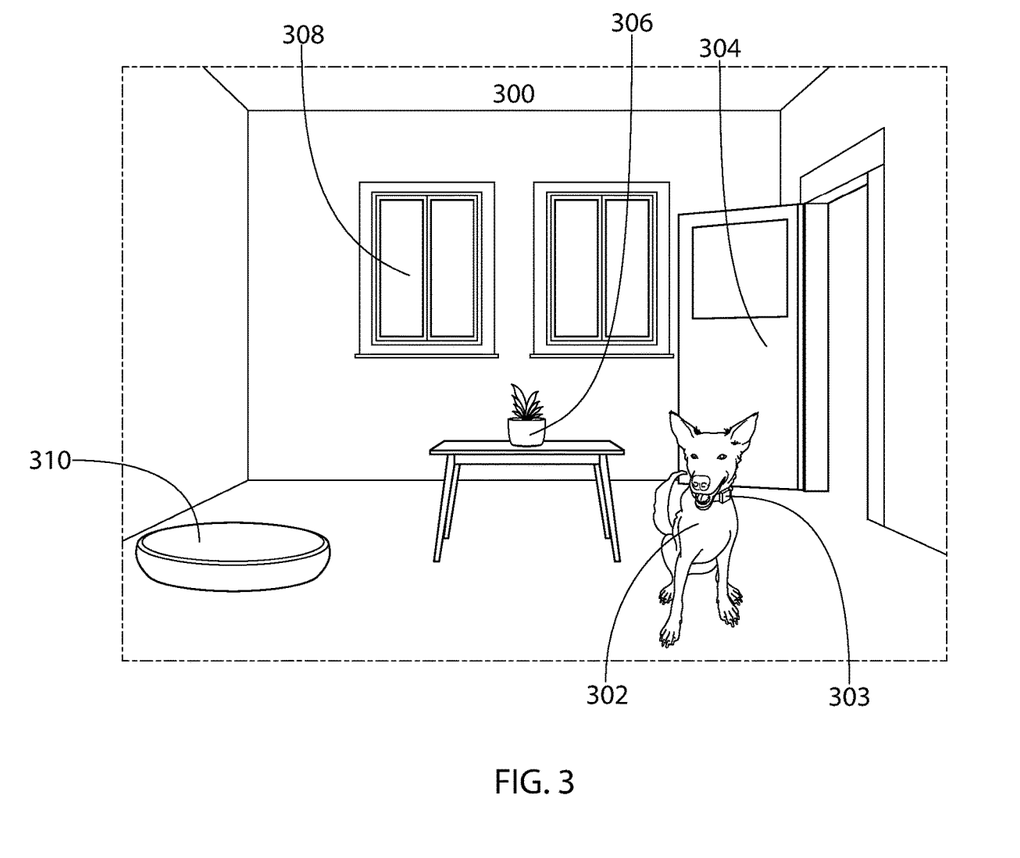
FIG. 3 shows an example image of an animal in which machine learning may be used to determine a body attribute of an animal, as described herein.

In FIG. 2, at 202, each of the images may be labeled with an indication of attributes relating to the animal in the image. For example, image 300 may be one of many images used to train a model. In examples in which image 300 is a training image, a value of the IBW, BCS, BFI, and weight, and/or metrics related to IBW, BCS, BFI and weight, of dog 302 may be provided and used to train models. Multiple steps may be used to derive metrics of interest from the metrics used to train the model. Input data to train a model may take the form of a video where multiple images in a temporal sequence are provided. Additional input data to train a model, alongside images/videos, may take the form of other sensor data such as 3D/volumetric data from a depth sensor, prior information such as breed, and the like.

The images and associated indications of attributes relating to the animal in the image may be stored in a database, may be provided to the training model via wireless and/or wireless methods, and the like.

At 204, the images depicting the animal, which may include additional data sources and/or prior information, and the associated indication of attributes relating to the animal may be provided to a machine learning model (e.g., deep learning model) for training. As shown on FIG. 4, images (e.g., original images) may be cropped, resized and/or enlarged. Enlargement processes may include upsampling low-resolutions images to improve image quality. Portions of the animal may be better visualized and/or determined due to the enlargement of image 300. For example, FIG. 4 focuses on dog 302 rather than the objects shown in image 300. Thus, a better view of the portions of the dog 302, such as ear 402, eye 420, foot 404, may be seen. Additionally, or alternatively, objects may be better viewed by enlarging the image, such as collar 303 shown on FIG. 4. The images (e.g., data) provided to the model for training may be augmented so that more varied data may be provided to the training model. In examples, image 300 may be augmented in other ways, such as rotating, flipping, enlarging, erasing pixels, or other modifications or combinations of modifications to the images to provide more varied image data to the training model. Such augmentation techniques are intended as examples only. One or more other techniques for augmenting images or additional data sources may be used. The model (e.g., machine learning model) may be housed on the device 100 and/or on one or more other devices, such as an external server, a mobile device, and the like.

Objects within the images, or additional data sources, of the animal may be segmented. For example, as shown on FIG. 5, the animal (e.g., dog 302) within the images may be segmented into an animal portion 502 and another (e.g., background) 550 portion. In examples in which more than one animal is shown in an image, individual animals may be separately segmented, grouped as one or more animal segments, and the like. Segmented images may assist in the training of the machine learning model (e.g., deep learning), as the training will be based on relevant information relating to the animal and not background artifacts in the environment. For example, the BCS is based on portions of dog 302, and not based on the background information within a room in which dog 302 is located. In other examples one or more portions of the animal may be segmented such that only those portions are presented to the machine learning model.

In the training phase, the model learns the features that are most relevant and indicates the different values of IBW, BCS, BFI, and weight. The model may be trained with images and provide a form of supervision to learn whether predictions are correct from known values of IBW, BCS, BFI, and weight. A single machine learning model may perform multiple tasks, such as predicting IBW, BCS, BFI, and weight. Model validation may be conducted by a performance evaluation based on predictions on data not used during training. Model validation may determine when to stop the training phase.

Figure 4:
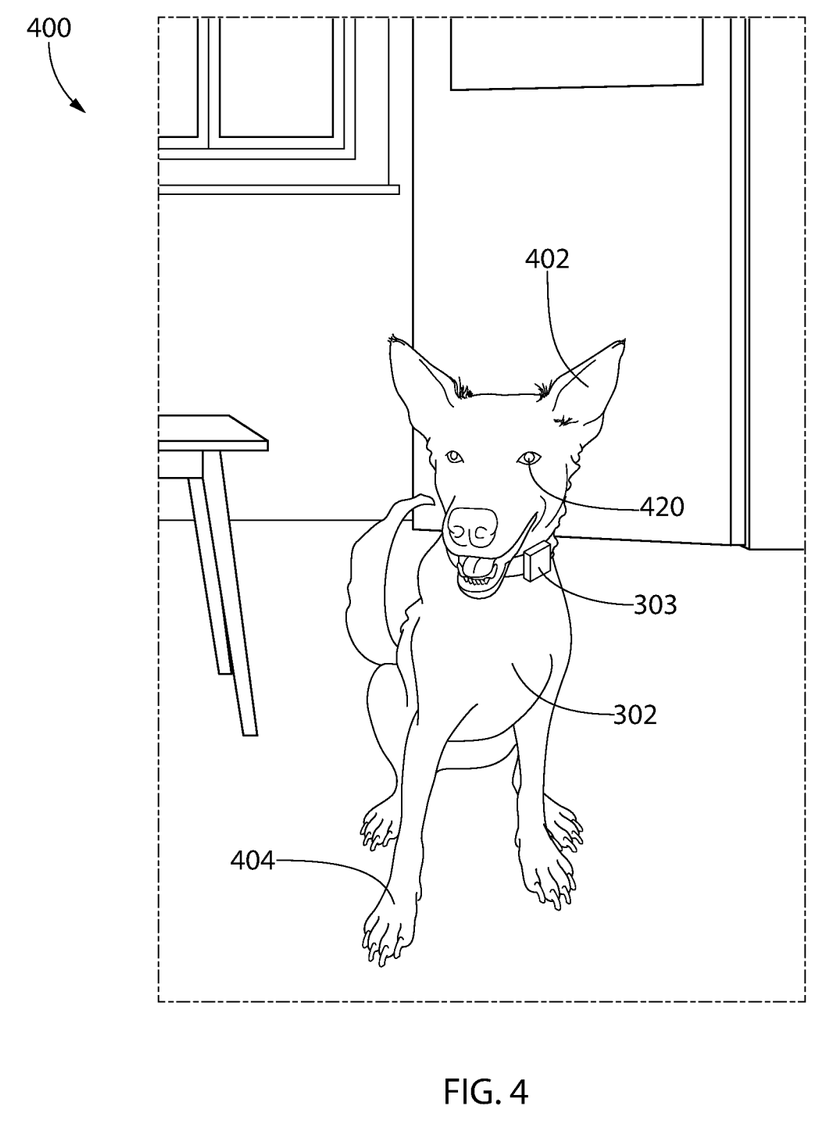
FIG. 4 shows an example image of an animal in which the cropped image includes an expanded view of the animal, as described herein.
Figure 5:
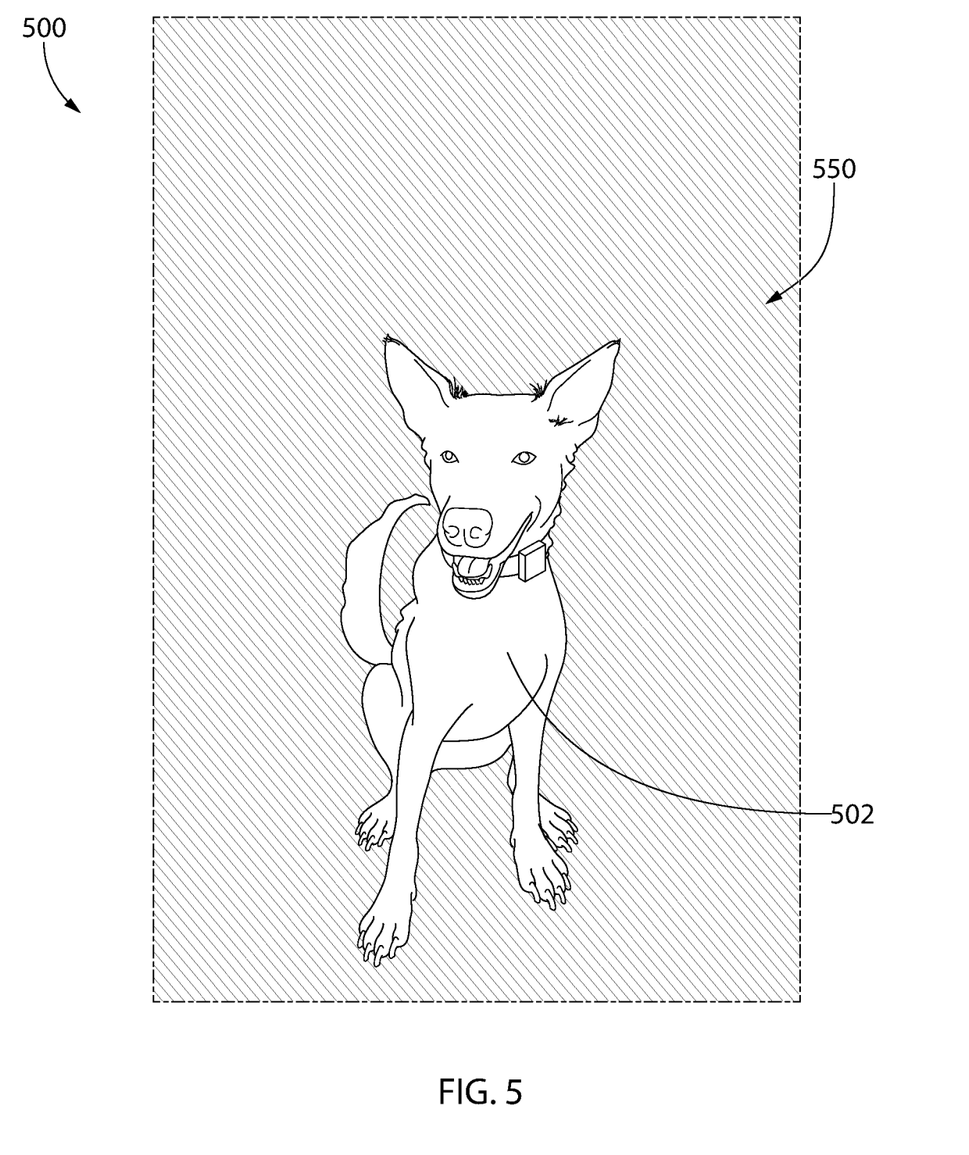
FIG. 5 shows an example image of an animal in which the animal and objects surrounding the animal may be segmented, as described herein.

At 206, one or more images, or additional data sources, of an animal may be presented to the trained model for determination of an IBW, BCS, BFI, and/or weight of the animal. The images may include an image 300 of the animal and objects in which the animal is located (FIG. 3), a cropped and/or exploded image 400 of the animal (FIG. 4), and/or a segmented image 500 of the animal (FIG. 5). The images may include one or more profiles of the animal, such as a front profile of the animal, a side profile of the animal, a top profile of the animal, rear profile of the animal, or a combination thereto. The quality of the image may be determined, or improved by upsampling the resolution, before the model determines an IBW, BCS, BFI, and/or weight of the animal. Although the above example describes an image, such is for illustration purposes only and is non-limiting. Examples may include an image (e.g., a still image, a video), thermal images, depth determining images, and the like.

At 208, the image, or additional data sources, may be presented to the model (e.g., the trained or learned model). The model may reside on device 100 or may reside external to device 100. At 210, the model may determine (e.g., predict) a body attribute (e.g., weight, IBW, BCS, BFI) of one or more animals presented within the image. The body attribute may be associated with a single animal presented within the image, a group of two or more animals within the image, and the like. In examples, the model may be instructed how many animals within the image (and which animals) the body attribute should be determined for, the type of body attribute to be determined, and the like. At 210, the model may predict the body attribute of the animal. The prediction may be performed on data that was not part of the training dataset. For example, the trained model may be used to predict endpoints on new data (e.g., data not evaluated by the training dataset).

As described herein, the image may be augmented and/or segmented prior to being provided to the machine learning model. FIG. 4 shows a cropped image 400 that has undergone an enlargement process to upsample the resolution, thus enlarging properties of the animal, and FIG. 5 shows an example segmented image 500 of an animal and a background depicted within images. Images of the animal used for training the model (e.g., deep learning model) may be augmented and/or segmented, and images of animal in which body attributes of the animal may be predicted via the trained model (e.g., deep learning model) may be segmented. One or more animals and/or objects shown on the images may be augmented and/or segmented. The augmented and/or segmented images may be provided for training the machine learning (e.g., deep learning) model.

Image processing may be performed on the image prior to be presented to the machine learning model. The image processing may include determining whether the quality of the image is approved (e.g., of sufficient quality) for being input into the deep learning model for prediction of the body attribute of the animal. For example, whether the focus of the image is above a predetermined threshold. An enlargement process may be applied to upsample low-resolution images to improve image quality. In addition, or alternatively, image processing may be performed that may include upsampling or zooming into one or more portions of the animal, such as the head of the animal, the torso of the animal, the feet of the animal, etc. Pre-processing may be performed that may result in zooming into portions of the animal that may be indicative of a body attribute of the animal.

Figure 6:
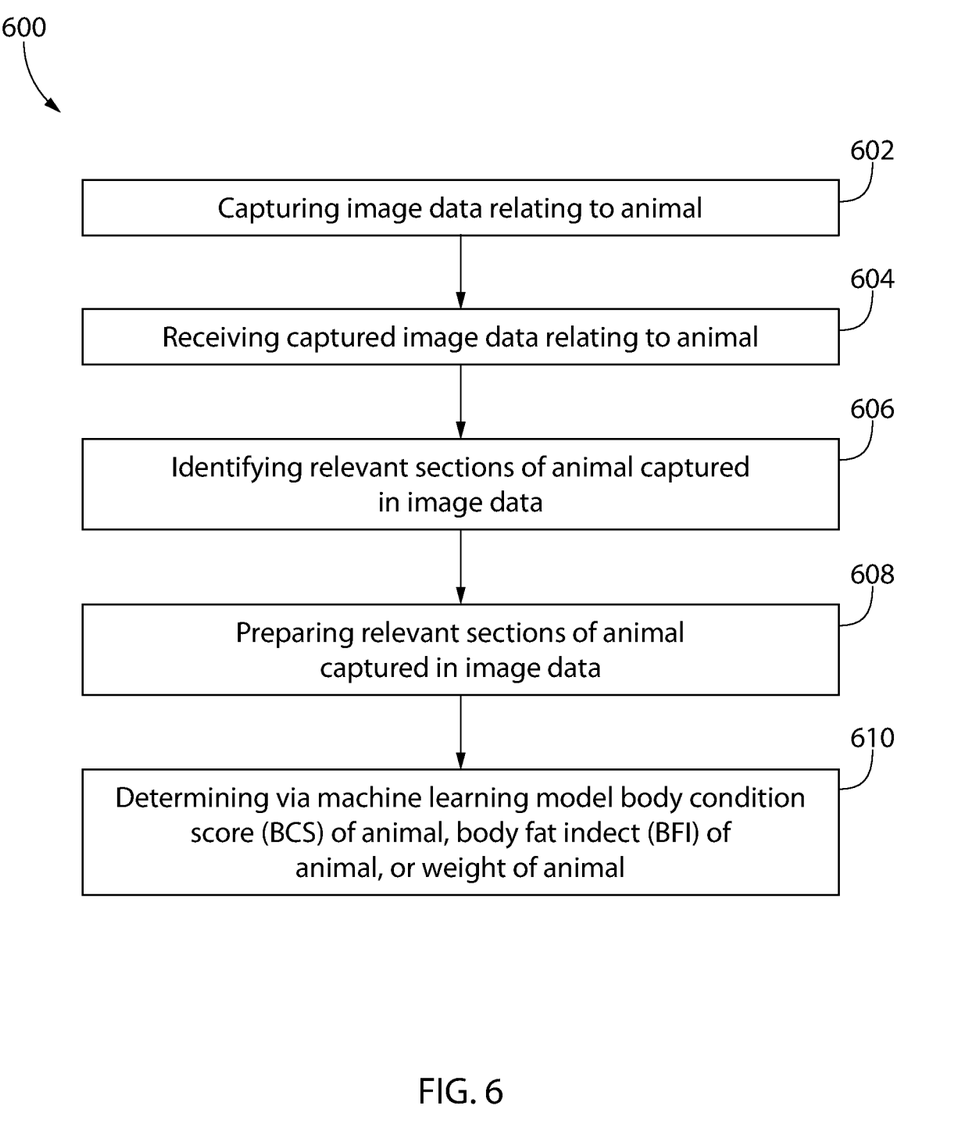
FIG. 6 describes an example process for determining a body attribute of an animal, as described herein.

FIG. 6 describes an example process 600 for using the device 100 to determine body attributes of the animal, such as IBW, BCS, BFI, weight, and the like. At 602, data (e.g., image data) relating to an animal may be captured. The data may be captured via a camera, a camcorder, a microphone, a weight scale, and the like. The data may relate to the animal at a particular location, such as a feeding area, a sleeping area, an area for play and/or exercising of the animal, a medical facility, etc. The data may relate to one or more animals. The data may be captured a single time point or multiple time points. The data may include the measurements or metrics derived from the measurements such as the range, mean, standard deviation, or other characteristics of the data's probability distribution, which may improve model performance and prediction accuracy.

The data may be captured on a periodic basis, such as time of day (e.g., in the morning, in the evening, at 8 a.m.), day of the week/month etc. The data may be captured based on a motion (e.g., the animal entering the location). The data may be captured based on the presence of a particular animal in a frame of data. The data may be captured based on an attribute of an animal or part of an animal including shape, color, measurements or other characteristics. The data may be captured based on events inside/outside the environment that are directly/indirectly related to the animal and its presence or interaction with the environment and objects/animals in the environment. The data may be saved in storage 112, transmitted to one or more devices (e.g., external device), and the like. The captured data may be received, for example via a processor and/or an external device, at 604.

At 606, relevant sections (e.g., portions) of the animal depicted within the image may be identified and/or determined. For example, the entire animal (e.g., head, neck, torso, and appendages) may be identified and/or determined. The entire animal may be identified and/or determined via one or more. Images may be discarded if they are of an unacceptable quality (e.g., not focused) and may be preserved if they are of an acceptable quality or can be improved an enlargement process to upsample the images.

By identifying at least two portions of the animal (including the entirety of the animal), the body attributes of the animal may be performed holistically. A holistic approach of determining body attributes of an animal may provide a benefit over simply identifying a single portion of the animal and determining the body attribute of the animal based on the single portion of the animal. The portions (e.g., at least two portions) of the animal may be identified and/or determined from one or more profiles of the animal, such as the front profile, a side profile, a top/bottom profile, a rear profile, etc. In examples one or more portions of the animal may be identified from one or more (e.g., a combination) of profiles of the animal. For example, a body portion of the animal may be determined from a front profile of the animal and a side portion of the animal.

Portions of the animal may be identified, determined, and/or distinguished, as described herein. The portions may be distinguished during pre-processing (e.g., prior to the data being input into the machine learning model), during the data being processed by the machine learning model, and/or during post-processing (e.g., after the data is input into the machine learning model). The portions of the animal may be identified, determined, and/or distinguished via one or more methods. Identifying the portions of the animal may assist and/or permit the shape of the animal to be determined (such as the size, shape, length, or width of the animal), which may result in the machine learning model performing a more accurate determination of the body attribute of the animal.

For example, a pet owner may rate the fur of the pet as absent, thin, medium, thick, very thick, etc. as part of a body scoring process. Based on the body score it may be determined how much the hair and/or fur may affect the size of the animal, shown in the image. For example, an animal with a thick coat may be smaller than the image of the animal conveys. Such information may be used in combination with the machine learning techniques to determine the body attributes of the animal. In another example, the outline of the animal in an image may be compared to one or more models, stock images, and/or standards for animals (e.g., animals of the same or similar size and/or breed as the animal relating to the animal data). The models, stock images, and/or standards for the animals may be used with the image of the animal to determine the actual size and/or shape of the animal. Information from standards (such as breed standards, historical information collected on the animal, typical weight, size, proportions, etc. collected on other animals, owner reported information or information from the animal's environment (including other animals) may be used with the image of the animal to determine the actual size and/or shape of the animal.

The system may determine and/or consider changes of how light and/or the lack of light may impact the appearance of the animal. Changes in light passing through fur may be used to indicate a presence of an animal's body. For example, fur color, characteristics or transparency may change based on distance from the body. The system may determine how light reflecting off fur of the animal may indicate curves, shape, and/or sizes of the body of the animal. The size and/or shape of the animal may be determined based on a comparison with another object of predetermined size and structure (e.g., object 306) in the environment in which the animal is located, as described herein. Cameras with particular functionalities may be used to determine a shape, size, and the like, of the animal. For example, depth sensing cameras may be used to estimate distances and/or to determine sizes (such as sizes of one or more portions of the animal, or the size of the entire animal). Signals (e.g., audio signals) may be used to estimate distances and/or to determine sizes (e.g., sizes of the animal). Thermal sensing may be used to determine a cloud of heat emanating from the animals body. The cloud of head emanating from the body of the animal may follow the shape of the body and/or be proportional to the thermal mass of the animal.

A ratio between an expected size of a portion of an animal and the actual size of the portion of the animal (including features of the animal, such as the eyes, ears, nose, etc., or distance between or across features of the animal or image such as eyes, ears, nose, etc.) shown within an image may be used to estimate distance and/or calculate size of the animal (e.g., portions of the animal). Although the disclosure describes the eyes of the animal (as the eye size/position may have relatively low variability among animals and usually visible in photos), such description is for illustration purposes only. As another example, the ratio between expected and actual size of teeth in an image may be used to estimate distance and/or calculate size of the animal, as the teeth may have relatively low variability among animals).

A tail, ear, nose, paw, belly, or other part of the animal may be used to estimate whether the animal has fluffy fur or smooth fur. A depth estimate may be used across the animal's body. In another example, facial fur of the animal may be used to estimate the depth of fur as the nose, lips, and/or eyes of the animal may have little to no fur depth and the top of head, ears, and/or shoulders may have full fur depth. There may be a gradation of depth between the body of the animal and the head of the animal. Proportions on the animal may be used to estimate fur depth, such as to identify consistent relationships between the leg/leg portion of the animal and the back length of the animal, to determine leg/leg portion of the animal and leg height to belly of the animal, etc. The misalignments of the determined proportions may be used to estimate fur depth of the animal.

For animals wearing a collar, the fur depth of the animal may be determined by the positioning/depth of the worn collar in the fur and the amount of fur showing over the collar. The size of the collar may provide a fixed size in the image. For example, if the width of the collar or size of the collar is known, a comparison may be used to determine the size of the animal. The size of the animal in relation to a size of a wearable device (e.g., a wearable device having a known size) may provide a fixed point to estimate the animal's size. In other examples the gait of the animal (e.g., the distance traveled by the animal per step, or distance traveled by the animal in a fixed period of time) may be used to estimate distance and/or provide a point from which the animal's height, body length, or body depth may be determined.

One or more portions of the animal may be removed or enhanced for determination of the body attribute of the animal (e.g., determination via machine learning techniques). For example, one or more extremities of the animal may not be relevant for the determination of the body attribute of the animal. As an example, the system may identify the tongue of an animal (due to the tongue hanging in a downward direction). The tongue of the animal may be disregarded during the determination of the body attribute of the animal. Portions of the body may be determined (e.g., disregarded or enhanced) due to the color of the portion of the body. For example, the color of the tongue of the animal may be pink. As a result, portions of the animal that are pink may be disregarded when determining the body attribute of the animal.

Measurements of the animal may be used to determine a body attribute of the animal. For example, the length of the animal from the chest to the rear of the animal may be determined. The length of the animal from the chest to the rear of the animal may be determined using vertical angles of the body of the animal (from the chest) to front paws, and under the tail of the animal to the back paws. In examples, extremity measurements may be used to determine the size of the animal. For example, the paws or ears of the animal may be used to determine if the animal has large or small extremities. The image may be adjusted due to the size of the animal, such as for small, medium, or large extremities of an animal. The ratio between the ears (or nose or paws) of the animal and the body width of the animal may be determined.

It may be determined whether the ratio is consistent across animals of a healthy weight. For example, it may be determined whether the proportions are indicative of an overweight animal. Such information may be used prior to the image being input into the machine learning model (e.g., for pre-processing of the image) and/or the information may be input into the machine learning model (e.g., to supplement the machine learning model).

In FIG. 6, at 608, relevant sections of the animal captured in the image data may be provided to the machine learning model. For example, the image of the animal (e.g., portions of the animal) may be input into the machine learning model. As described herein, the entire image of the animal may be input into the machine learning model and/or two or more portions of the animal may be input into the machine learning model. The images input into the machine learning model may relate to a single profile of the animal or multiple profiles of the animal. The images input into the model may result from preprocessing, as described herein. For example, the heat emanating from the animal (via a thermal camera) may be input into the camera, etc. The machine learning model may perform techniques (e.g., deep learning techniques) to determine a body condition of the animal, as described herein.

The machine learning techniques may be supervised machine learning techniques, semi-supervised machine learning techniques and/or unsupervised machine learning techniques. The machine learning techniques may include deep learning techniques. The machine learning model may improve its ability to perform a task as it analyzes more data related to the task during a training stage and/or a stage of retraining/tuning/refinement. These stages may include input from users in the form of labels that describe IBW, BCS, BFI or weight, or associated attributes relating to these. As described herein, the task may be to determine (e.g., predict) a body attribute (e.g., IBW, BCS, BFI, weight, etc.) of the animal. The model may provide more accurate determinations of body attributes based on the model receiving numerous pieces of information of animals, for example, via augmentation of image data, and the like. The machine learning model may be trained using a set of training examples. Each training example may include a data (e.g., image data) relating to an animal along with a value relating to a body attribute of the animal. By processing a set of training examples that include the animal data (e.g., animal image data) and the value relating to the body attribute, the model may determine (e.g., learn) the attributes or characteristics of the animal data that are associated with a particular body attribute of the animal. This learning may then be used to predict the body attribute of the animal or to predict a classification for other body attributes.

At 610, a body attribute (e.g., a body condition score (BCS), a body fat index (BFI), or a weight (such as ideal body weight, IBW)) of the animal depicted in the image may be determined (e.g., predicted) via machine learning techniques, as described herein. As an example, the body attribute of the animal may be determined via machine learning processing of data consisting of portions of the body of the animal in the image, the entire body of the animal in the image, or combinations thereof. One body attribute may be determined or more than one body attribute may be determined. The body attribute may relate to a single animal or more than one animal.

Information in addition to, or alternative to, the body attribute of the animal may be provided. For example, an indication of how the body attribute was determined and/or predicted may be provided. For example, the body attribute may have been based on a size of the torso of the animal and a size of a foot of the animal. The body attribute may be determined based on a side profile of the animal. The system may provide an indication of what information (e.g., portions of the animal) was not used in the determination of the body attribute. For example, the user may be informed that the ears of the animal were not used in the determination of the body attribute of the animal. The user may be informed that the ears were not used in the determination of the body attribute because the image quality of the ear was of poor quality or because the ear of the animal was determined to be irrelevant to the determination of the body attribute.

The system may provide an indication of how the determination of the body attribute may be improved, for example, for future determinations of the body attribute. For example, the system may indicate that the images provided for the current determination were of front profiles of the animal, and that rear profiles of the animal may provide more accurate determinations of body attributes of the animal. Based on this information the user of the system may ensure that future data relating to the animal include the rear profile of the animal.

Information relating to the body attribute may be provided to one or more users, persons, or entities. For example, the body attribute of the animal may be provided to the pet parent of the animal, one or more veterinarians, and the like. The information relating to the body attribute may be stored on a device (e.g., storage device 112). The information may be tracked and/or graphed for identifying how the body attributes of the animal are changing over time. If the animal is determined to be obese, remediation actions may be received to the pet parent. The body attribute information may be provided to the user, the veterinarian, etc., in one or more ways. For example, the body attribute information may be provided to a mobile phone, a tablet, a laptop, etc. The body attribute may be processed and/or saved via a server, in examples.

While the inventions have been described with respect to specific examples including presently preferred modes of carrying out the inventions, those skilled in the art will appreciate that there are numerous variations and permutations of the above described systems and techniques. It is to be understood that other embodiments may be utilized and structural and functional modifications may be made without departing from the scope of the present inventions. Thus, the spirit and scope of the inventions should be construed broadly as set forth in the appended claims.

What is claimed is:

1. A system for determining a body attribute of an animal, the system comprising:
   one or more sensors configured to capture image data relating to the animal; and
   one or more processors configured to:
      receive the captured image data relating to the animal;
      identify at least two portions of the animal depicted within the image data;
      input, into a machine learning model, the at least two portions of the animal depicted within the image data; and
      determine, via the machine learning model and the at least two portions of the animal, an ideal body weight (IBW), a body condition score (BCS) of the animal, a body fat index (BFI) of the animal, or a weight of the animal.

2. The system of claim 1, wherein the at least two portions of the animal comprise at least two of a nose, an ear, a torso, or a foot of the animal.

3. The system of claim 1, wherein the at least two portions of the animal comprise at least four of a nose, an ear, an eye, a torso, at tail, or a foot of the animal.

4. The system of claim 1, wherein the at least two portions of the animal comprise all of a nose, an ear, an eye, a torso, a tail, and a foot of the animal.

5. The system of claim 1, wherein the sensor is at least one of a camera or a camcorder.

6. The system of claim 5, wherein the camera is at least one of a thermal camera configured to determine an outline of the animal based on heat emanating from the animal or a depth sensing camera configured to determine distances within the image data or sizes within the image data.

7. The method of claim 6, wherein an estimated size or shape of at least one portion of the animal is determined based on the shape of the body following the emanating heat.

8. The system of claim 1, wherein the machine learning model determines the at least one of the body condition score (BCS) of the animal, the body fat index (BFI) of the animal, ideal body weight (IBW), or the weight of the animal, or other attributes of the animal or part of the animal, such as height, width, length, depth, diameter, radius, circumference and the like via machine learning and deep learning techniques.

9. The system of claim 1, wherein the one or more processors is configured to train the machine learning model via receiving, into the machine learning model, a plurality of training image data relating to other animals and other objects.

10. The system of claim 1, wherein at least one of the one or more processors are located on a mobile device or a server.

11. The system of claim 1, wherein the one or more processors is configured to manipulate the received image data via cropping the animal from the received image data.

12. The system of claim 1, wherein the one or more processors is configured to manipulate the received image data via segmenting the image data into a first segment comprising the animal within the image data and a second segment comprising all objects other than the animal within the image data.

13. The system of claim 1, wherein a size of one or more of the portions of the animal are determined based on a comparison of the animal captured in the image data and at least one object captured in the image data.

14. The system of claim 13, wherein the at least one object in the image data is at least one of a door, a window, a wall, a table, a bed, a food or water dish, an automatic feeder, a toy, a height chart, another animal, or a vessel.

15. The system of claim 1, wherein the at least one processor knows the dimension of the at least one object captured in the image data.

16. The system of claim 1, wherein the one or more processors are configured to cause to be displayed the determined ideal body weight (IBW), body condition score (BCS) of the animal, the body fat index (BFI) of the animal, and/or the weight of the animal.

17. A method for determining a body attribute of an animal, the method comprising:
   capturing, via one or more sensors, image data relating to the animal;
   receiving the captured image data relating to the animal;
   identifying at least two portions of the animal depicted within the image data;

inputting, into a machine learning model, the at least two portions of the animal depicted within the image data; and determining, via the machine learning model and the at least two portions of the animal, an ideal body weight (IBW), a body condition score (BCS) of the animal, a body fat index (BFI) of the animal, or a weight of the animal.

18. The method of claim 17, wherein the at least two portions of the animal comprise at least two of a nose, an ear, a torso, or a foot of the animal.

* * * * *